US012200420B2

(12) United States Patent
Alwicker et al.

(10) Patent No.: US 12,200,420 B2
(45) Date of Patent: Jan. 14, 2025

(54) MICROPHONE ASSEMBLY, FILTER FOR MICROPHONE, PROCESS FOR ASSEMBLY AND MANUFACTURING MICROPHONE AND FILTER FOR MICROPHONE, AND METHOD FOR FILTERING MICROPHONE

(71) Applicant: Shure Acquisition Holdings, Inc., Niles, IL (US)

(72) Inventors: Michael Alwicker, Chicago, IL (US); Michael Alan Diamond, Arlington Heights, IL (US); Charles S. Argento, Chicago, IL (US); Benjamin Jay Grigg, Chicago, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 104 days.

(21) Appl. No.: 17/959,869

(22) Filed: Oct. 4, 2022

(65) Prior Publication Data

US 2023/0106070 A1 Apr. 6, 2023

Related U.S. Application Data

(60) Provisional application No. 63/252,363, filed on Oct. 5, 2021.

(51) Int. Cl.

*H04R 1/08* (2006.01)
*H04R 1/04* (2006.01)
*H04R 7/12* (2006.01)

(52) U.S. Cl.

CPC ............... *H04R 1/086* (2013.01); *H04R 1/04* (2013.01); *H04R 7/127* (2013.01); *H04R 2410/07* (2013.01)

(58) Field of Classification Search

CPC ............................ H04R 1/086; H04R 2410/07
See application file for complete search history.

(56) References Cited

U.S. PATENT DOCUMENTS 3,550,720 A * 12/1970 Ballard .................. H04R 1/086 181/175
5,808,243 A * 9/1998 McCormick ........... H04R 1/086 367/901

(Continued)

FOREIGN PATENT DOCUMENTS

DE 202013006246 U1 8/2013
GB 2208577 A 4/1989

(Continued)

OTHER PUBLICATIONS

English machine translation KR 10-2010-0000564 (Jang Dong-U; The Crown Shape Type of Sound Pressure Controller for Dynamic Microphone; published Jan. 2010) (Year: 2010).*

(Continued)

*Primary Examiner* — Mark Fischer
(74) *Attorney, Agent, or Firm* — Banner & Witcoff, Ltd.

(57) ABSTRACT

A microphone assembly can include a microphone capsule having a diaphragm and a diaphragm cover, a grill for protecting the microphone capsule, and a filter material placed between the grill and the diaphragm cover. The microphone assembly can include a first air gap between the grill and the filter material to create a first interface, a second air gap between the filter material and the diaphragm cover to create a second interface, and a third air gap between the diaphragm cover and a diaphragm to create a third interface. The first interface, the second interface, and the third interface are each configured to create turbulence to assist in draining off energy from plosives and wind and reduce intensity of disturbances at the diaphragm. The filter material may include a mesh and can be supported by a frame, and the frame may be configured to fit underneath the grill.

20 Claims, 13 Drawing Sheets

(56) References Cited

U.S. PATENT DOCUMENTS

| | | | | |
|---|---|---|---|---|
| 7,415,122 | B2 | 8/2008 | Soutar et al. | |
| 7,946,379 | B1 | 5/2011 | Frenchik | |
| 8,005,250 | B2 | 8/2011 | Josephson et al. | |
| 8,369,556 | B2 | 2/2013 | Power | |
| 8,737,662 | B2 | 5/2014 | Zukowski | |
| 9,294,829 | B2 | 3/2016 | Dannesboe et al. | |
| 9,467,760 | B2 | 10/2016 | Kawakami et al. | |
| 2005/0063560 | A1 | 3/2005 | Soutar et al. | |
| 2010/0119097 | A1 | 5/2010 | Ohtsuka | |
| 2013/0051591 | A1 | 2/2013 | Dannesboe et al. | |
| 2014/0064544 | A1* | 3/2014 | Zukowski | H04R 1/083 381/360 |
| 2017/0026731 | A1 | 1/2017 | Kawakami et al. | |
| 2018/0070161 | A1 | 3/2018 | Horn et al. | |
| 2018/0316998 | A1 | 11/2018 | Uchida | |
| 2019/0273986 | A1* | 9/2019 | Kawakami | H04R 1/326 |
| 2019/0297414 | A1 | 9/2019 | Gorny et al. | |
| 2021/0245675 | A1* | 8/2021 | Yoshino | G08B 5/36 |

FOREIGN PATENT DOCUMENTS

| | | | | | |
|---|---|---|---|---|---|
| GB | 2386497 | A | | 9/2003 | |
| JP | S59146294 | A | | 8/1984 | |
| JP | 2001091351 | A | * | 4/2001 | |
| JP | 2003163982 | A | | 6/2003 | |
| JP | 2008048309 | A | | 2/2008 | |
| JP | 2009246959 | A | * | 10/2009 | |
| JP | 2009246960 | A | * | 10/2009 | |
| KR | 20100000564 | A | * | 1/2010 | H04R 9/02 |
| WO | 07052866 | A1 | | 5/2007 | |

OTHER PUBLICATIONS

English machine translation JP2008048309A (Akino Yutaka; Microphone Accessory; published Feb. 2008) (Year: 2008).* https://www.podcastinsights.com/best-pop-filters/, visited Jun. 23, 2021.

https://www.amazon.com/Stedman-Corporation-Proscreen-XL-Black/dp/B000BO8ZGQ, visited Jun. 23, 2021.

https://www.bhphotovideo.com/c/search?Ntt=Metal%20Mesh%20Pop%20Filter&N=0&InitialSearch=yes&gclid=EAlalQobChMI_dnK14iv8QIVaEpyCh1rkAZIEAAYAiAAEgK7SPD_BwE,k visited Jun. 23, 2021.

https://www.amazon.com/MXL-PF-003-Metal-Filter-Silver/dp/B001ECQOOO, visited Jun. 23, 2021.

Pop Filters—Metal vs Nylon Fabric https://www.youtube.com/watch?v=6rxVgn5O9 visited Jun. 23, 2021.

Golden Age Project SP1 Shockmount with Meal Pop Filter https://www.sweetwater.com/store/detail/GASP1-golden-age-project-sp1-shockmount-with-metal-pop-filter, visited Jun. 23, 2021.

Jan. 31, 2023—(WO) International Search Report and Written Opinion—App PCT/US2022/077535.

* cited by examiner

MICROPHONE ASSEMBLY, FILTER FOR MICROPHONE, PROCESS FOR ASSEMBLY AND MANUFACTURING MICROPHONE AND FILTER FOR MICROPHONE, AND METHOD FOR FILTERING MICROPHONE

CROSS-REFERENCE TO RELATED APPLICATIONS

This application claims priority to U.S. application Ser. No. 63/252,363, filed on Oct. 5, 2021, the disclosure of which is fully incorporated by reference herein.

FIELD

The present disclosure relates generally to microphone filters for filtering pops or plosives and air noise picked up by microphones, processes for assembling and manufacturing microphones and filters for microphones and methods for filtering microphones.

BACKGROUND

Microphones convert sound into an electrical signal through the use of a transducer that includes a diaphragm, to convert sound by sensing changes in pressure into mechanical motion, which in turn is converted into an electrical signal. Specifically, the sound being captured generates periodic waves in air, and these waves cause the diaphragm to move from its resting place. The diaphragm, which can be housed in a capsule, converts sound waves (physical air pressure changes) into an electrical signal. The electrical signal can then be used in an electronic reproduction of the original sound from the source.

Microphones can be categorized by their transducer method and how they convert sound waves into electrical signals (e.g., condenser, dynamic, ribbon, carbon, laser, or microelectromechanical systems (MEMS)). In some examples, vocal microphones are placed six inches or less from the singer or announcer. Yet in certain instances, this may generate unwanted noises that occur when the signer or announcer sings or says certain plosives for example, hard consonants—p's, b's. Such plosives can create bursts of air that hit the diaphragm in such a way that creates distortion of the desired sound. With these plosives, the output of the microphone can be manifested as a popping or humming sound that is undesirable to the listener.

SUMMARY

The following presents a simplified summary of the disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

The present disclosure pertains to a microphone assembly and filter for filtering plosives and wind, methods for assembling the microphone assembly and filter, and methods for filtering plosives and wind.

In one example, a microphone assembly can include a microphone capsule having a diaphragm and a diaphragm cover, a grill for protecting the microphone capsule, and a filter material placed between the grill and the diaphragm cover. The microphone assembly can include a first air gap between the grill and the filter material to create a first interface, a second air gap between the filter material and the diaphragm cover to create a second interface, and a third air gap between the diaphragm cover and a diaphragm to create a third interface. The first interface, the second interface, and the third interface are each configured to create turbulence to assist in draining off energy from plosives and wind and to reduce intensity of disturbances at the diaphragm. The filter material may include a mesh and can be supported by a frame, and the frame may be compressible and configured to fit underneath the grill.

In another example, a method for filtering a microphone can include one or more of providing a first air gap between a grill and a filter material to create a first interface, providing a second air gap between the filter material and a diaphragm cover to create a second interface, and providing a third air gap between the diaphragm cover and a diaphragm to create a third interface. One or more of the first interface, the second interface, and the third interface can be configured to create turbulence to assist in draining off energy from plosives and wind and to help reduce intensity of disturbances at the diaphragm caused by plosives and wind.

These as well as other novel advantages, details, embodiments, features and objects of the present disclosure will be apparent to those skilled in the art from following the detailed description of the disclosure, the attached claims and accompanying drawings, listed herein, which are useful in explaining the disclosure.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various examples, reference is made to the accompanying drawings, which form a part hereof, and in which is shown by way of illustration various examples in which aspects may be practiced. References to "embodiment," "example," and the like indicate that the embodiment(s) or example(s) of the disclosure so described may include particular features, structures, or characteristics, but not every embodiment or example necessarily includes the particular features, structures, or characteristics. Further, it is contemplated that certain embodiments or examples may have some, all, or none of the features described for other examples. And it is to be understood that other embodiments and examples may be utilized and structural and functional modifications may be made without departing from the scope of the present disclosure.

Unless otherwise specified, the use of the serial adjectives, such as, "first," "second," "third," and the like that are used to describe components, are used only to indicate different components, which can be similar components. But the use of such serial adjectives are not intended to imply that the components must be provided in given order, either temporally, spatially, in ranking, or in any other way.

Also, while the terms "top," "bottom," "side," and the like may be used in this specification to describe various example features and elements, these terms are used herein as a matter of convenience, for example, based on the example orientations shown in the FIGS. and/or the orientations in typical use. Nothing in this specification should be construed as requiring a specific three dimensional or spatial orientation of structures in order to fall within the scope of the claims.

Figure 1:
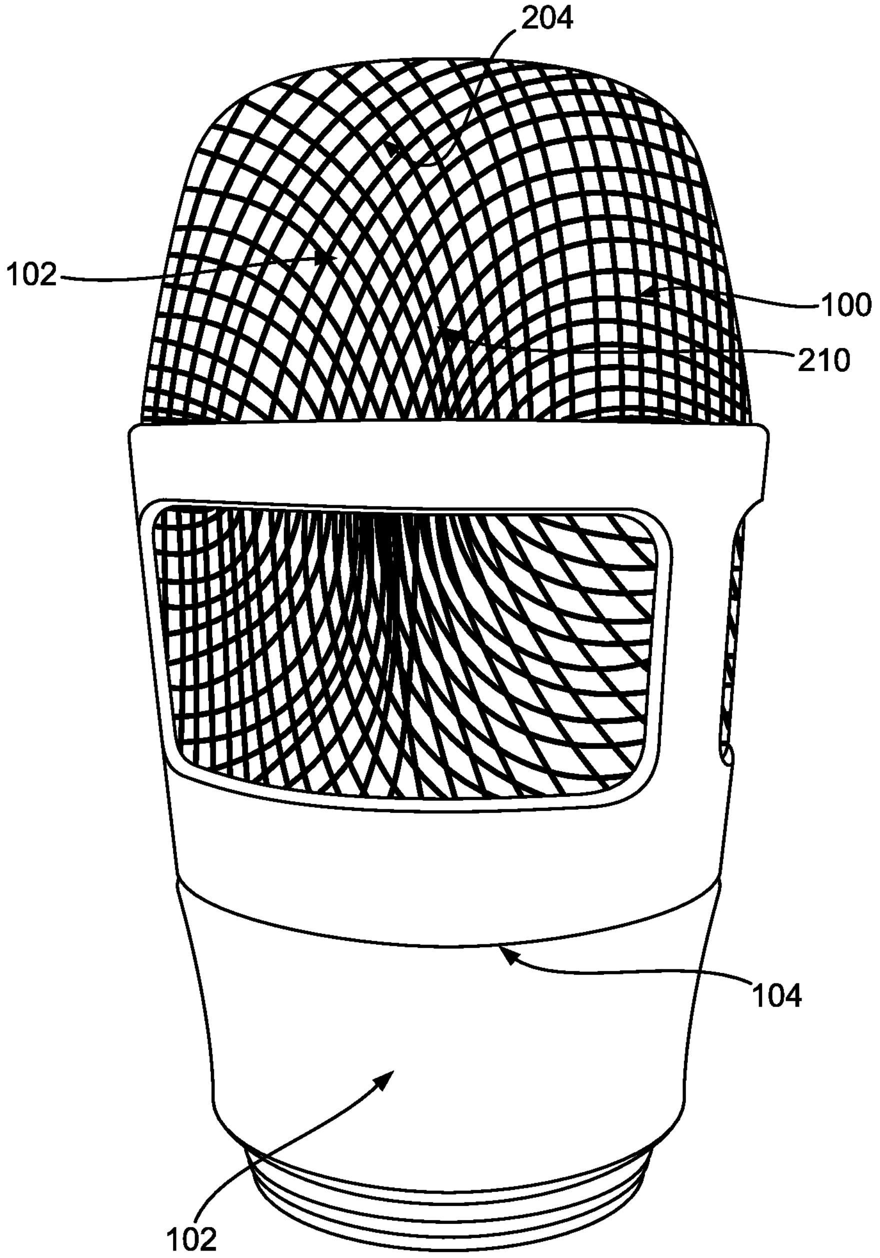
FIG. 1 shows an example microphone capsule and grill.

FIG. 1 shows an example microphone grill 102. The grill 102 can be in the form of a solid metal mesh. The grill 102 forms a protective environmental barrier that can be configured to protect the microphone capsule 104 (shown in FIG. 2) from damage, such as if the microphone is dropped or knocked over. In certain examples, the grill 102 can be designed such that it can absorb impacts to protect the capsule 104. And in some examples, the grill 102 may be configured to deform more easily to absorb impacts and prevent damage to the capsule 104. The grill 102 can also act as a windscreen and protect the capsule 104 from gusts of air thereby mitigating plosive effects. The grill 102 can also protect the capsule 104 from moisture.

Other grill forms, shapes and sizes are also contemplated such as dome shaped, circular disk shaped, concave shape, convex shaped, cup shaped, or bar-shaped. Also, the grill may be configured to be detachable and can include any type of removable fasteners or connections, for example, threaded connections, snap-fit or friction-fit connections, ball and socket connections, bayonet connections, etc. But the grill can also be fully integrated with the microphone and configured to be not removable in other examples depending on the desired characteristics of the microphone.

Figure 2:
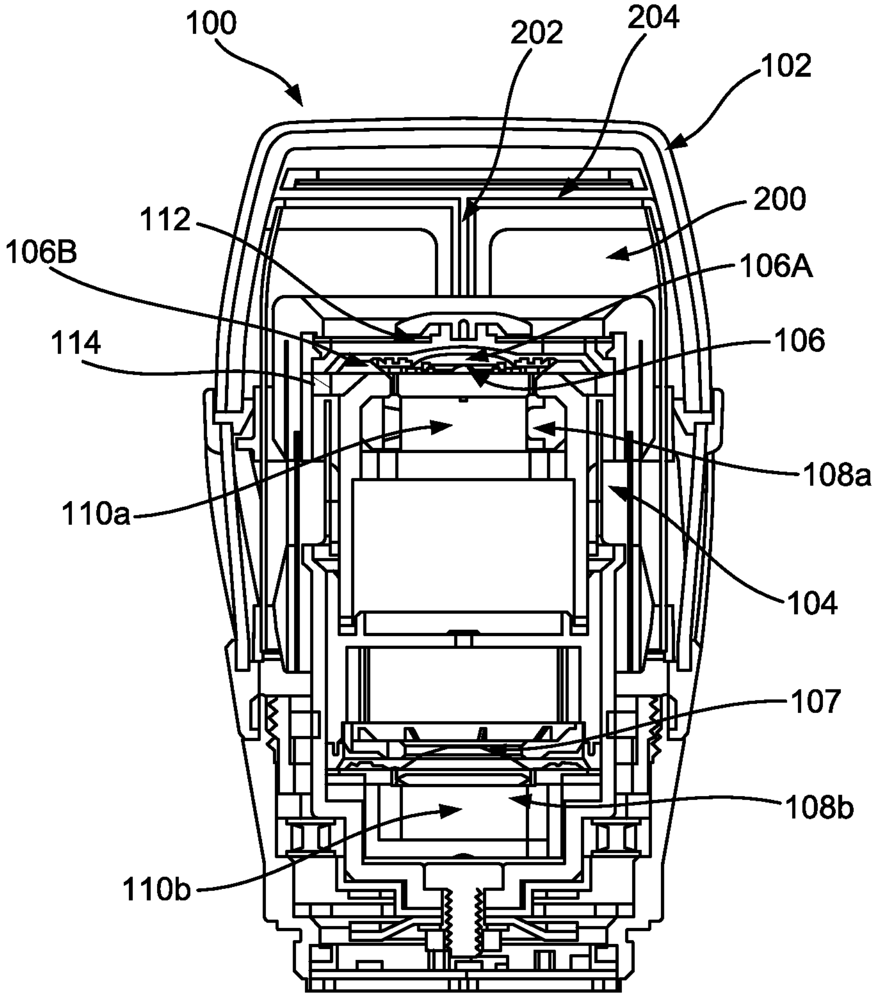
FIG. 2 depicts a cross-sectional view of an exemplary microphone assembly.

FIG. 2 shows a cross-sectional view of an example microphone assembly 100. As shown in FIG. 2, the microphone 100 can include a filter 200 that sits between the grill 102 and the capsule 104. As will be discussed in further detail below, the filter 200 acts as a pop filter to help filter away any plosive effects or wind noise. In this example, the filter 200 can be configured to surround and generally encapsulate the microphone capsule 104. The microphone capsule 104 can be in the form of a dynamic microphone capsule. Yet other microphone types are contemplated, for example, condenser, ribbon, carbon, piezoelectric, fiber-optic, laser, liquid, MEMS, etc.

The microphone capsule 104 can include an upper and lower assembly each having a flexible membrane or diaphragm 106, 107, a moving conductive coil or voice coil 108*a* 108*b*, and magnet 110*a*, 110*b*. The diaphragms 106, 107 can each be attached to the respective conductive coil 108*a* 108*b*. In each assembly, when the diaphragm 106, 107 vibrates, it causes the coil 108*a*, 108*b* to oscillate or move up and down past the magnet 110*a*, 110*b* and the associated magnetic field of the magnet 110*a*, 110*b*. The vibrations of the diaphragm 106*a*, 106*b* cause the conductive coil 108*a*, 108*b* to vibrate in the magnetic field generated by the magnet 110*a*, 110*b*, resulting in the conversion of acoustic energy incident upon the diaphragm into electric energy. The electric energy is in the form of a current in the coil 108*a*, 108*b* as the conductive coil 108*a*, 108*b* moves across the magnetic field. This current is the electrical audio signal generated by the sound waves.

In one example, the upper assembly can be used to detect sound waves; whereas the bottom assembly can be used to detect mechanical vibrations. The sound waves can be output from the microphone, and the mechanical vibrations can be detected and canceled out by the microphone so mechanical vibrations encountered by the microphone are not output with the sound waves and do not create noise in the output signal. It is also contemplated that a single diaphragm, coil, magnet assembly could be used.

In one example the diaphragm 106 can be circular. And the diaphragm 106 can have a central, inner spherical section or dome 106A and an outer semi-toroidal section 106B concentric with the dome 106A. Yet other shapes and configurations are completed for diaphragm 106, such as dome shaped, donut shaped, thin ribbon, flat circles, flat rectangles, etc. In one example, the diaphragm can be formed of an elastomeric material such as Polyethylene terephthalate (PET). Also the microphone capsule 104 can be provided with a dust cover 112 for covering the diaphragm. The diaphragm 106 may be stretched over a diaphragm frame 114 and glued or adhesively affixed to the diaphragm frame 114.

Figure 3A:
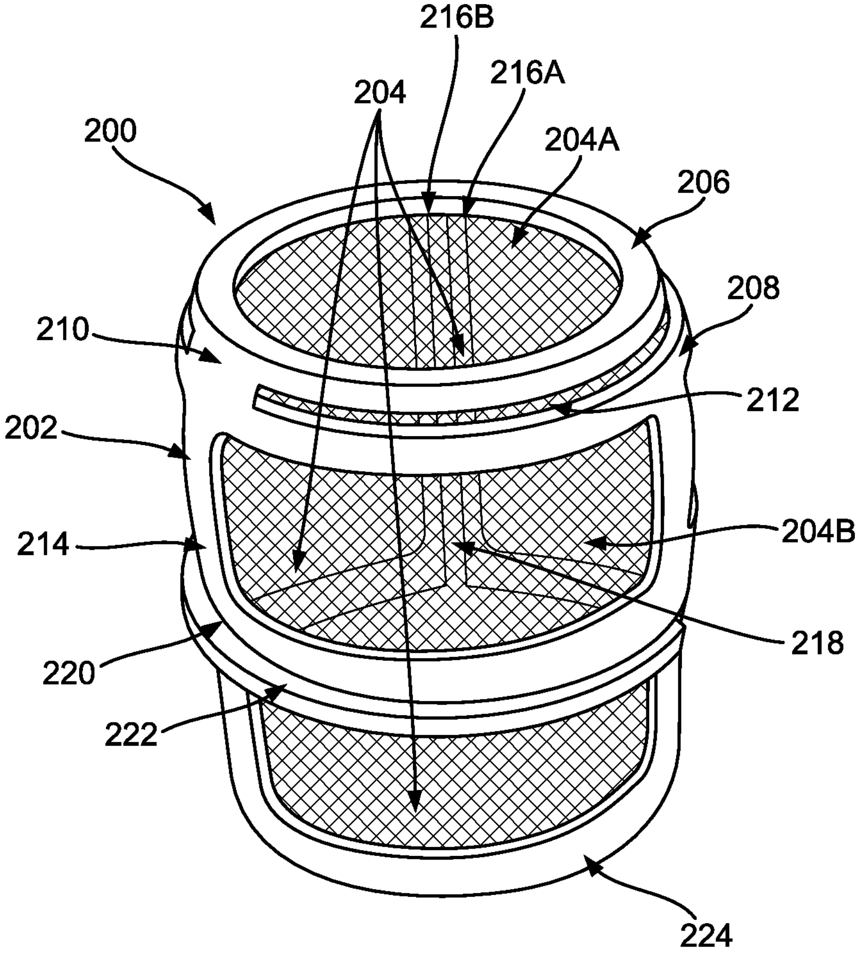
FIG. 3A illustrates a first perspective view of an example filter for a microphone assembly.
Figure 3B:
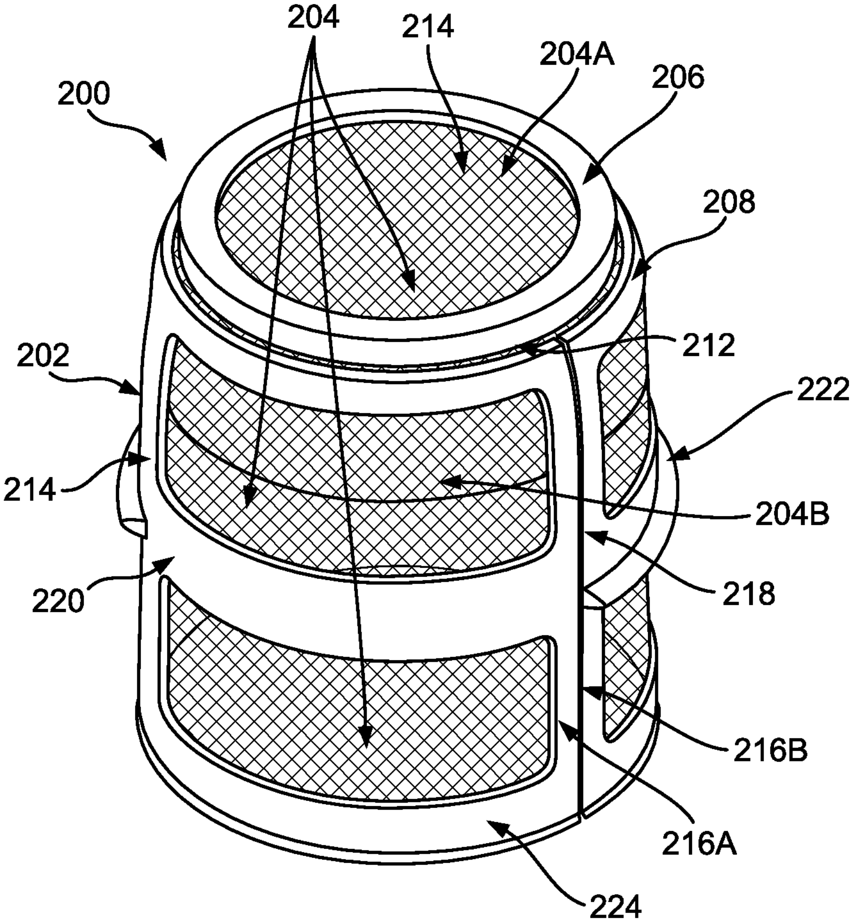
FIG. 3B illustrates a second perspective view of an example filter for a microphone assembly.

FIGS. 3A and 3B show an example filter 200 that can be used in conjunction with the microphone assembly 100. The filter 200 can be configured to help filter plosives, which is discussed in further detail below. The filter 200 can include a flexible and collapsible frame 202 and filter material 204, which is also flexible. So both the frame 202 and the filter material 204 have a degree of flexibility and collapsibility, such that the filter 200 can be fit within the microphone assembly 100, i.e., the filter 200 (both the frame 202 and the filter material 204) is placed into the grill 102, and the grill is secured to the microphone assembly 100 via threads in one example for ease of assembling the microphone assembly 100 and removability of the filter 200. It is also contemplated that the filter 200 can be configured to be placed over the microphone capsule 104 and configured to fit beneath or under the grill 102 for ease of assembling the microphone assembly 100 and removability of the filter 200. As shown in FIGS. 3A and 3B, the filter is generally cup or cylindrical shaped with a covering over the top and an open bottom in its resting shape or configuration. Yet other shapes and configurations are contemplated depending on the type of microphone and the desired shape of the microphone.

In one example, the frame 202 can be injection molded and formed of a suitable flexible polymer. In addition, the frame 202 may be formed of a wire frame, spring steel, or other suitable flexible metal material. It is also contemplated that the frame could be formed of a wire frame, spring steel, or other a suitable flexible metal frame, which could also be coated with a polymeric material. It is also contemplated that the mesh material could be formed into the shape of a desired frame and the filter 200 could be formed without a frame or the entire filter 200 including the frame could be produced by 3D printing, SLA, MSLA, FDM, etc.

The frame 202 can include a top ring 206, which is connected to an upper side rib 208 at a single location or neck 210 such that a portion of the top 206 floats above the upper side rib 208 when the frame 202 is in the resting position. Also, the top ring 206 and the upper side rib 208 form a radial gap 212 on the frame 202 allowing for the top ring 206 to flex within the radial gap 212. The top ring 206 and upper side rib 208 extend in a radial or circumferential direction on the frame.

The upper side rib 208 is also connected to a vertically extending rib 214 and a pair of edge ribs 216A, 216B. The edge ribs 216A, 216*b* also form a gap 218, which extends in a vertical or an axial direction. Axial gap 218 also allows for the frame 202 to collapse in that the edge ribs 216A, 216B can abut each other during assembly and the filter can take up a smaller space and profile. Vertically extending ribs 214 are also connected to a middle rib 220. Additionally, the vertically extending ribs 214 can be connected to lower rib 224.

Middle rib 220 extends radially or circumferentially along the middle of the frame 202. Middle rib 220 can also include a locating projection or rib 222. Locating projection or rib 222 can form a ridge or ledge that can be used for locating the frame within the microphone assembly 100. For example, the microphone assembly 100 can include a corresponding ridge that abuts either the top surface or the bottom surface of the locating projection or rib 222 or a recess for receiving the locating projection or rib 222. Like the middle rib 220, the locating projection or rib 222 extends in a radial direction. Also the locating projection or rib 222 can in certain examples only extend part of the way around the filter's 200 circumference. And this can allow for the filter 200 to be installed into the microphone assembly 100 in a certain orientations. Also, the rib 222 can be configured to key into the grill 102 or to align properly within the grill 102, to prevent the filter 200 from moving around or vibrating inside the grill 102, while allowing it to be easy to install and remove. This can assist to prevent any excess handling noise and may assist in preventing noise from any resonances caused by the filter. The use of fewer or additional ribs extending in any direction to provide the desired frame properties is also contemplated.

In one example, the filter 200 can include sections of mesh material: a top section 204A and a sidewall section 204B. The top section 204A can be shaped, cut or formed as circular and can be disc-shaped. The sidewall 204B section can be shaped, formed or cut as a rectangular piece. The top section 204A and the sidewall section 204B can have the same thickness or different thicknesses. And in one particular example, the top section 204A mesh can be thicker than the sidewall section mesh 204B. Although again, the shapes of the top section 204A and the sidewall section 204B can vary based on the overall shape or type of microphone transducer, desired grill, and desired sound properties. The sidewall section 204B of the mesh can be configured to assist in preventing the plosive or pop phenomenon when a user is holding the microphone at a 45 or 90 degree angle for example. And in certain examples, alternating layers of filter material and air gaps can be provided along the sidewall section 204B to assist in mitigating the pop or plosive phenomenon.

The top section 204A can be adhered to the top ring 206 of the frame 202. And the sidewall section 204B can also be adhered to the frame 202 at the upper side rib 208, vertically extending ribs 214, pair of edge ribs 216A, 216B, middle rib 220, and lower rib 224. Yet it is also contemplated that the mesh material top section 204A and sidewall section 204B could be co-molded or insert molded with the frame 202 top ring 206, upper side rib 208, vertically extending rib 214, pair of edge ribs 216A, 216B, middle rib 220, and lower rib 224.

Suitable mesh materials include plastic, monofilament, and metal acoustic meshes as well as combinations thereof. In examples discussed herein, the mesh can be a metal acoustic wire mesh, which could be stainless steel, brass, aluminum, and other metals that are corrosion or rust resistant. And in one particular example, the mesh can be a wire cloth formed of a 304 stainless steel material having a mesh of 165×800 mesh count or a 200×600 mesh count and with a thickness of 0.0065 in. Also, the mesh can be a twilled Dutch weave wire cloth. Yet various weaving patterns and hole sizes are contemplated to achieve the desired acoustical resistance. In one example, the acoustical resistance of the mesh can range from 0.1 to 30 ohms Rayl CGS and in one example could be at or below 20 ohms Rayl CGS. Yet in one particular example, the acoustical resistance could be around 10 ohms Rayl CGS.

In alternate examples, other filter materials are contemplated. For example, porous materials, such as screens, sintered metal, rubbers, fibers (such as carbon fiber), sponges, foams, plant-based materials, can be used to filter plosives or pop and wind.

It is contemplated that the filter 200 can be removable from the microphone assembly 100, so the filter 200 is not permanently attached to the microphone assembly 100. This can allow the user to replace the filter 200 should it become worn or defective, and it allows the user to be able to customize the microphone with different filters depending on the desired pop effects Also because the filter 200 is removable from the microphone assembly 100, the grill 102 of the microphone can be customized. To customize the grill 102, the user can simply remove the filter 200 and apply color, coating, logos, paint, etc. and then replace the filter 200 and grill 102. For example, the above design can allow the user to remove the filter 200 in order to paint or plate the microphone as desired without compromising plosive and pop protection. In instances where filters are permanently attached to the grill, painting or plating may be more difficult because painting or plating the grill may cause degradation to the filter.

The example filter 200 can be configured as an acoustic filter to filter unwanted noises such as plosives, pop, and wind. In particular, the example filter 200 can be configured to filter certain plosives that occur when the signer or announcer sings or says certain plosives for example, hard consonants—p's, b's. The filter can be configured to filter these plosives that would otherwise hit the diaphragm in such a way that creates distortion of the desired sound. Accordingly, the filter 200 can help prevent certain popping or humming sounds that are undesirable to the listener.

Plosives, pop, and wind are solid-body-like molecules of air, which are mass motion of molecules and are not sound waves. Pop and wind are different only in the scale of the disturbance. Pop can be considered a small localized disturbance that generally only covers the front of the microphone. Wind, however, is a large disturbance that encompasses the entire microphone. The filter 200 can be configured to help filter both these large and small disturbances to reduce the intensity of the pop and wind disturbances prior to these disturbances hitting the diaphragm 106, so the sound amplified is mostly pressure waves in the air.

The filter 200 in conjunction with the microphone assembly 100 provides a pop filter that is small and effective. The filter 200 in connection with the microphone assembly 100 provides alternate layers of filter material and air gaps. The filter 200 in connection with the microphone assembly 100 are configured to create turbulence at the interface of the filter 200 and air gaps, discussed further below, which helps to drain off energy and reduce the intensity of the disturbances. The filter 200 and microphone assembly 100 design use multiple thin layers of filter material and air gaps in order to help minimize disturbances.

Also, suitable filter 200 mesh materials are able to mostly discern between the peak particle velocities in pop/wind, which are high, and the peak particle velocities in acoustic waves, which are low. And in one example, the suitable mesh material can have an acoustic resistance that has a non-linear response to particle velocity. Also, mesh material is long lasting and will not degrade over time and fall apart. Because the mesh material does not degrade over time, it also will not affect the pop performance of the microphone adversely. Also, the filter will not create messes within the microphone and harm the capsule of the microphone. Additionally, the filter 200 and microphone assembly 100 can provide for a small profile microphone with adequate protection against plosives and wind. As shown in FIG. 2, the microphone 100 can also have a flatter profile at the top portion of the grill 102.

In addition to filtering pop and plosives, the filter 200 in conjunction with grill 102 may also be configured to prevent moisture from entering the microphone capsule 104. And in one example, the grill 102 and filter 200 can be configured to prevent saliva from entering the microphone capsule 104.

Figure 4:
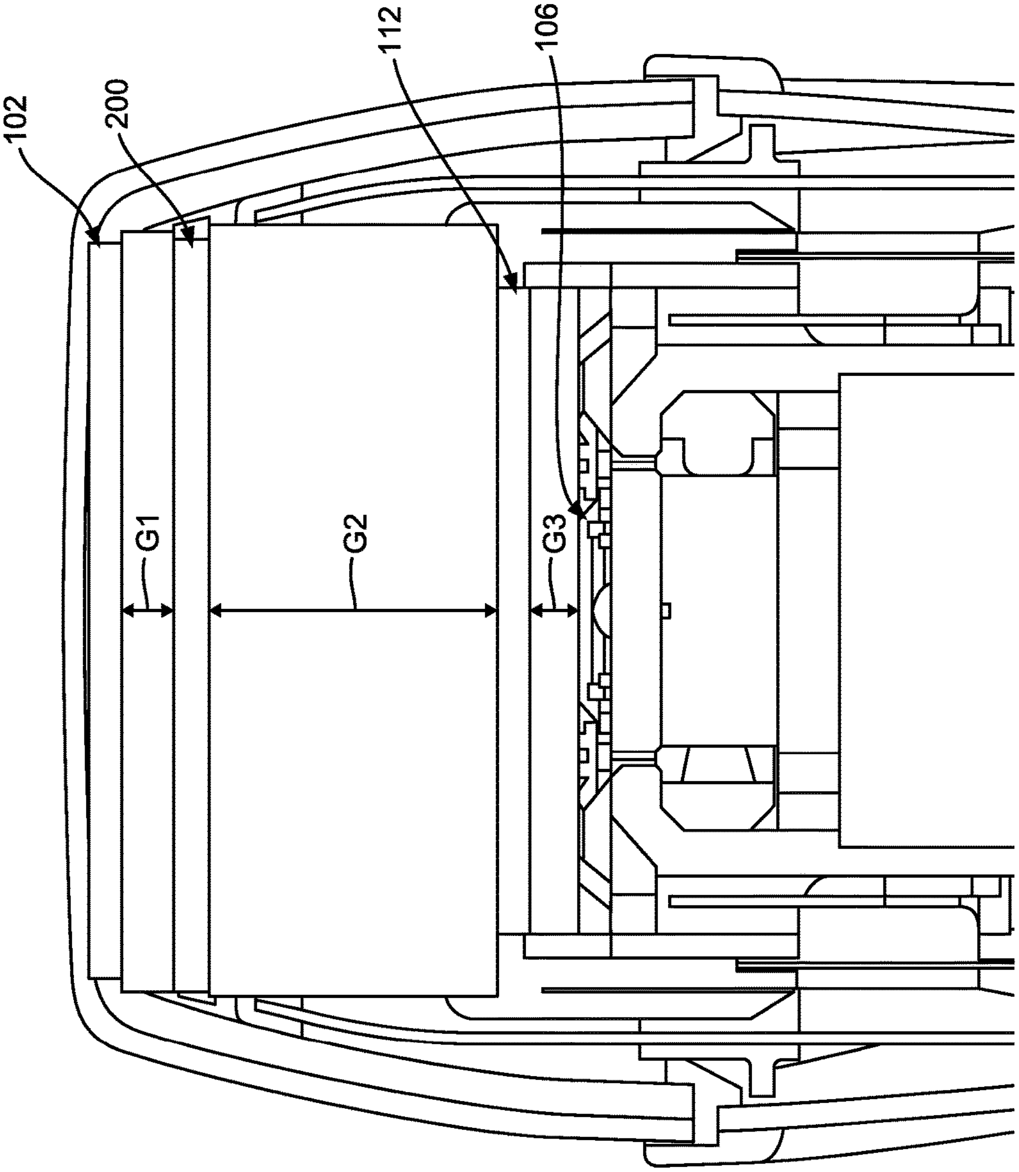
FIG. 4 is a similar cross-sectional view of the exemplary microphone assembly shown in FIG. 2 but schematically shows air gaps within the microphone assembly.

FIG. 4 schematically shows various gaps in the microphone assembly. As discussed above the microphone assembly 100 and filter 200 are provided with alternating layers of filter material and air gaps to create bands of turbulence at the interface of the filter material and the air gaps to help drain off energy and reduce the intensity of the disturbances. As sound waves enter into the microphone, a first air gap G1 is formed between the grill 102 and the filter 200, a second air gap G2 is formed between the filter 200 and the dust or diaphragm cover 112, and a third air gap G3 is formed between the dust cover 112 and the diaphragm 106. Also the first air gap G1 can be formed between the grill 102 and the filter 200 material to create a first interface, the second air gap G2 can be formed between the filter 200 material and the diaphragm cover 112 to create a second interface, a third air gap G3 can be formed between the diaphragm cover 112 and the diaphragm 106 to create a third interface. In one example, G1 can be at or between 0.0625 to 0.5 in. and in one particular example about 0.125 in.; G2 can be at or between about 0.0625 to 0.5 in. and in one particular example can be about 0.33 in. and G3 can be at or between about 0.0625 to 0.5 in. and in one particular example can be about 0.125 in.

These interfaces, i.e, the first interface, the second interface, and the third interface can each be configured to create turbulence to assist in draining off energy from plosives and wind and reduce intensity of disturbances at the diaphragm caused by plosives and wind. Additional air gaps can be provided within the filter and/or microphone assembly to create additional turbulence zones to reduce plosives and wind noise. Also omitting certain elements is also contemplated, such as using fewer air gaps depending on the desired microphone characteristics.

As such a method for filtering a microphone can includes one or more of the following steps: providing the first air gap G1 between the grill 102 and a filter 200 material to create the first interface, providing the second air gap G2 between the filter 200 material and the diaphragm 106 cover to create the second interface, and providing the third air gap G3 between the diaphragm cover 112 and the diaphragm 106 to create a third interface. And as such these interfaces, i.e., the first interface, the second interface, and the third interface can be each configured to create turbulence to assist in draining off energy from plosives and wind and reduce intensity of disturbances at the diaphragm caused by plosives and wind. Yet additional air gaps can be formed to create additional turbulence zones to reduce plosives and wind noise. Also the above exemplary method contemplates omitting certain steps such as using fewer air gaps The exemplary method may also include one or more of the following: forming the filter material of a mesh, supporting the filter material with a frame and configuring the frame to fit underneath the grill of the microphone, forming the frame to be collapsible, forming the frame with one or more gaps for collapsibility.

Figure 5:
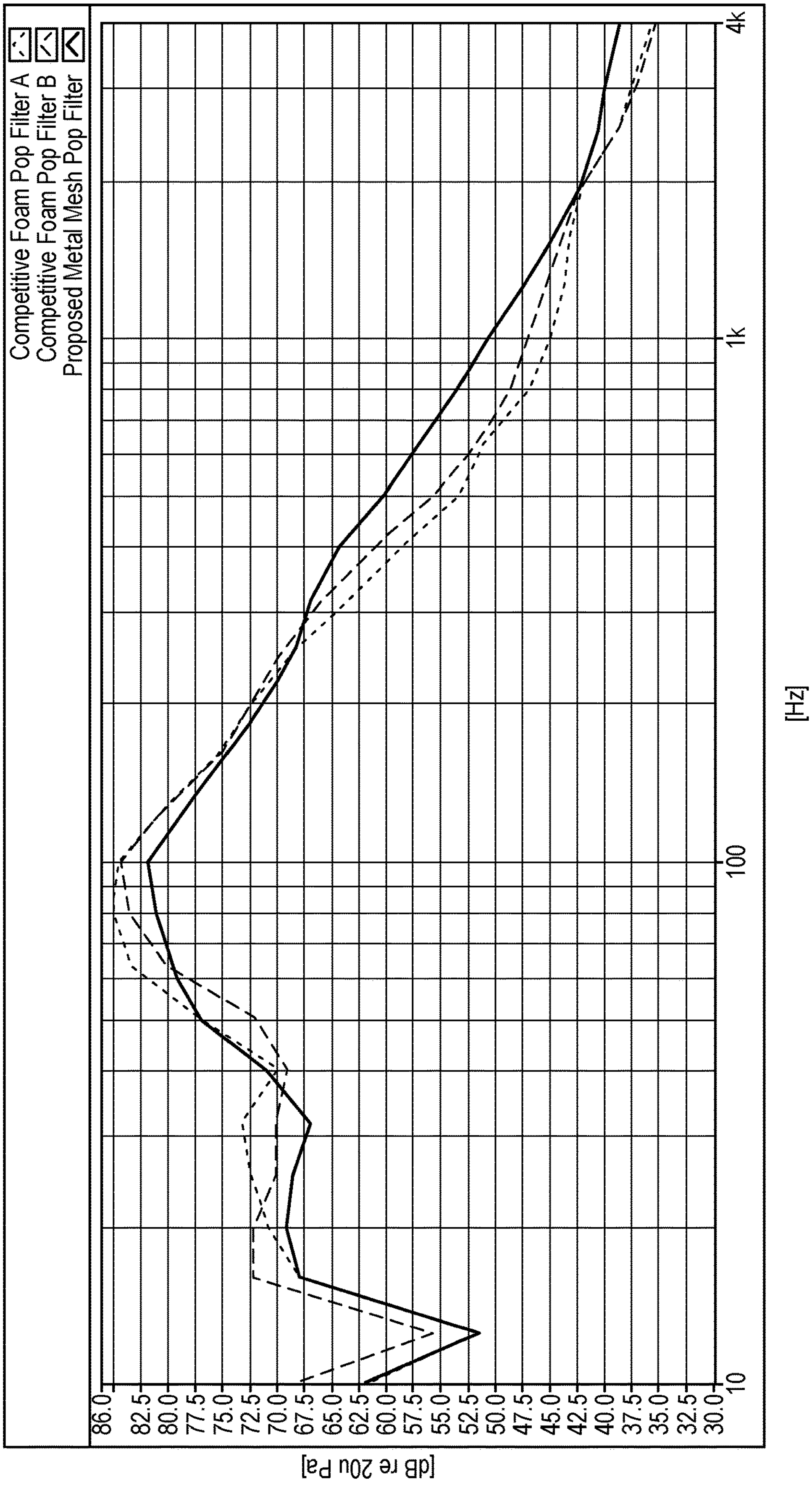
FIG. 5 shows an exemplary filter response graph with three different types of filters.

FIG. 5 shows an example frequency response of three separate types of filters, which includes a mesh filter and two different types of foam filters. The frequency response of the examples discussed herein can approximate the three plots shown in FIG. 5. In some examples, plosives and pop is generally a low frequency phenomenon. And the bulk of pops and plosives response is typically around 100 Hz. Also, in certain examples at 1 kHz, the pop and plosive response drops by about 20-30 dB, and it is contemplated that the filter could be configured to filter pops and plosives below 1 kHz. Yet in one particular example, the filter could be configured to filter pops and plosives in the range of 10-200 Hz.

Although the example herein deals with a dynamic microphone, it is contemplated that the example filter and filtering techniques can be used in conjunction with any microphone type including other forms of dynamic microphones, ribbon microphones, condenser microphones, and MEMS microphones.

It is also contemplated that such microphones can be used, for example, in the audio, electronics and instrumentation industries. And such microphones may be wired or wireless. If wired, these microphones can be connected to a transmitter or receiver via any one of a variety of different cables, including a twisted wire pair, a coaxial cable, or fiber optics. These wired microphones can also connect to a transmitter or receiver using any one of a variety of different connectors, including a LEMO connector, an XLR connector, a TQG connector, a TRS connector, a USB, or RCA connectors. Such microphones can also be wireless and connect an audio system through any one of a variety of protocols, including WiMAX, LTE, Bluetooth, Bluetooth Broadcast, GSM, 3G, 4G, 5G, Zigbee, 60 GHz Wi-Fi, Wi-Fi (e.g., compatible with IEEE 802.11a/b/g), or NFC protocols. Also such microphones can include a transmitter, which can be included within or attached to the microphone.

Figure 6A:
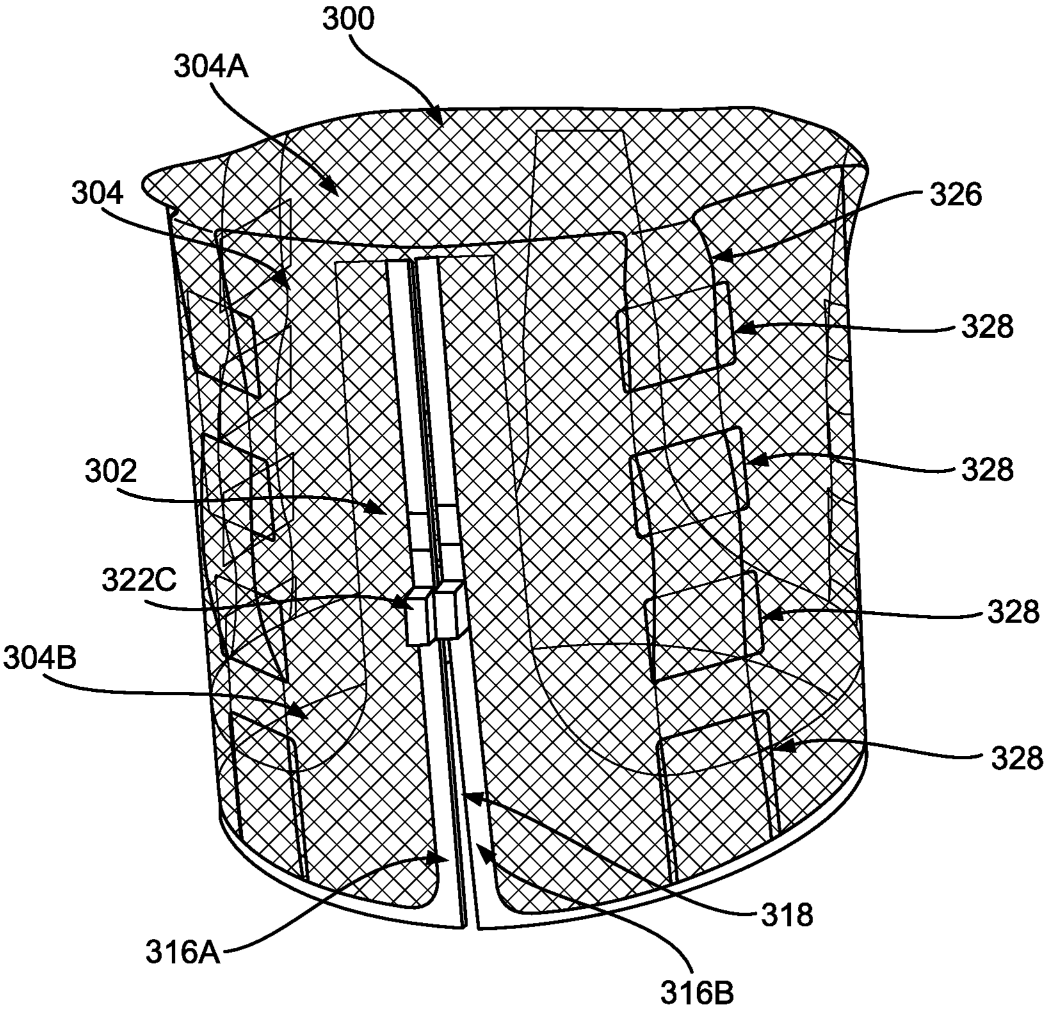
FIG. 6A shows a front perspective view of another example filter for a microphone assembly.
Figure 7A:
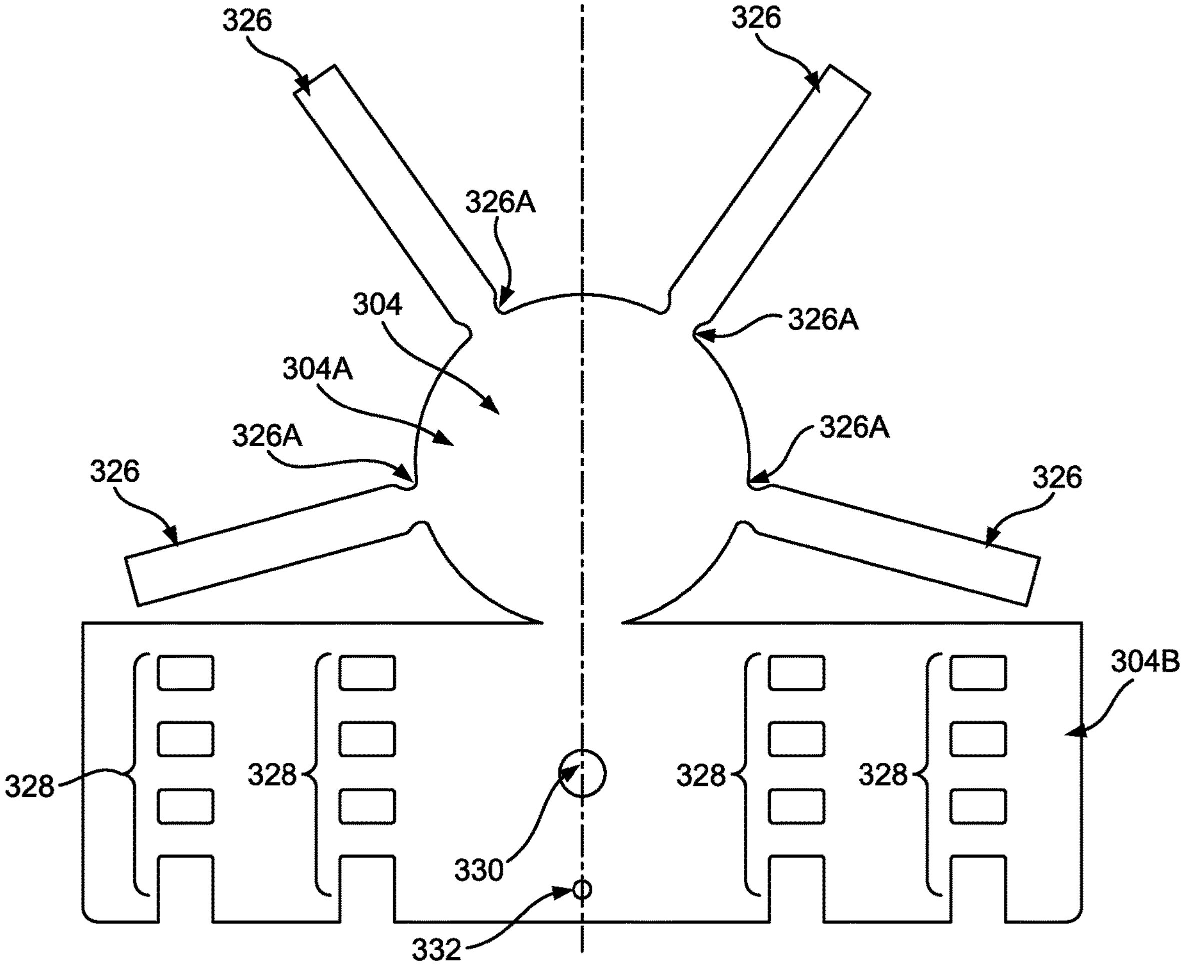
FIG. 7A shows an example material subassembly for the example filter of FIG. 6A.
Figure 7B:
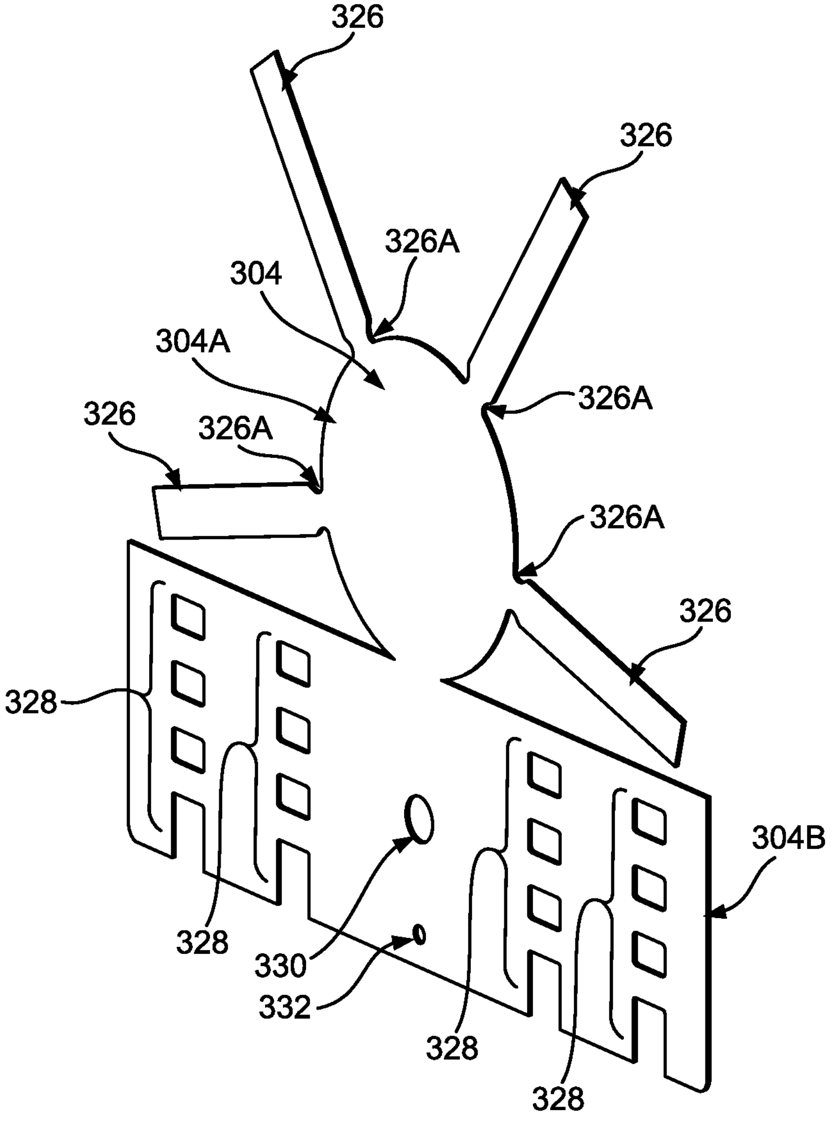
FIG. 7B shows a perspective view of the example material subassembly of FIG. 7A
Figure 8A:
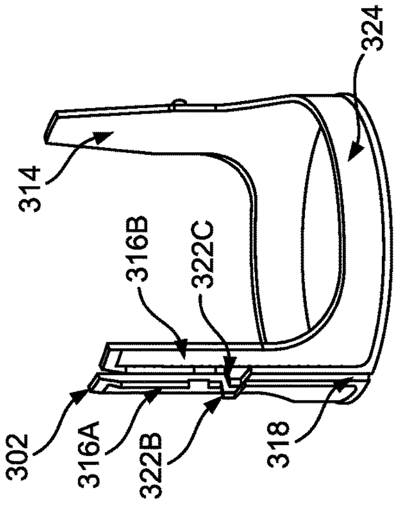
FIG. 8A shows a perspective view of an example frame subassembly for the example filter of FIG. 6A
Figure 8B:
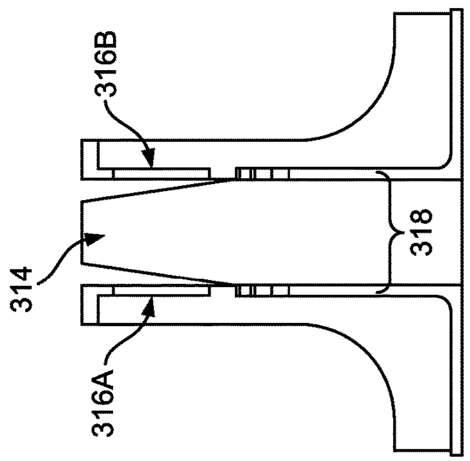
FIG. 8B shows a front view of the example subassembly frame of FIG. 8A.
Figure 8C:
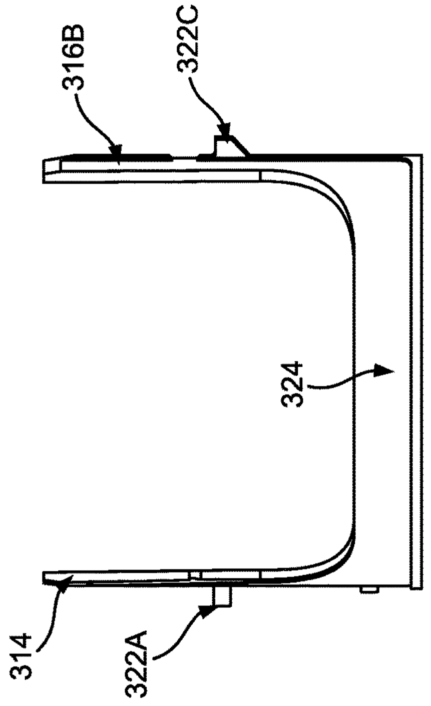
FIG. 8C shows a side view of the example subassembly frame of FIG. 8A.
Figure 8D:
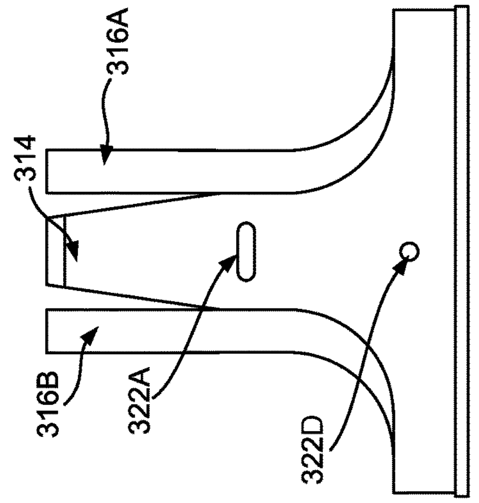
FIG. 8D shows a rear view of the example frame subassembly of FIG. 8A.
Figure 9A:
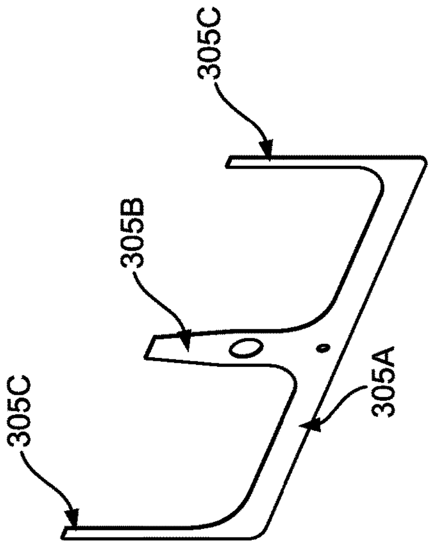
FIG. 9A shows a perspective view of a pressure sensitive adhesive subassembly for the example filter of FIG. 6A.
Figure 9B:
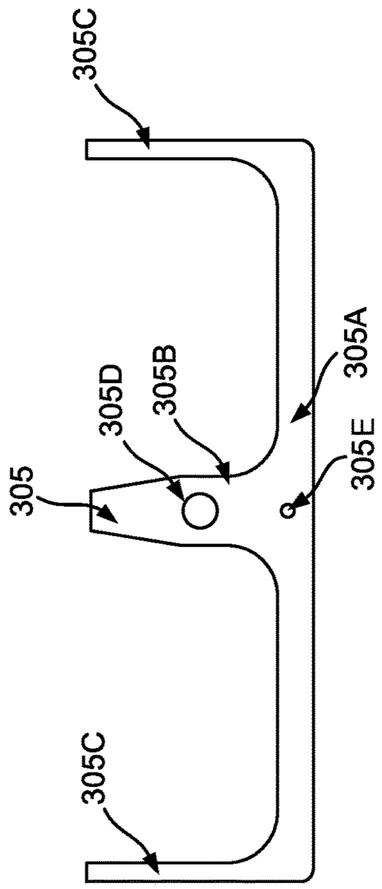
FIG. 9B shows a front view of the pressure sensitive adhesive subassembly of FIG. 9A.
Figure 8E:
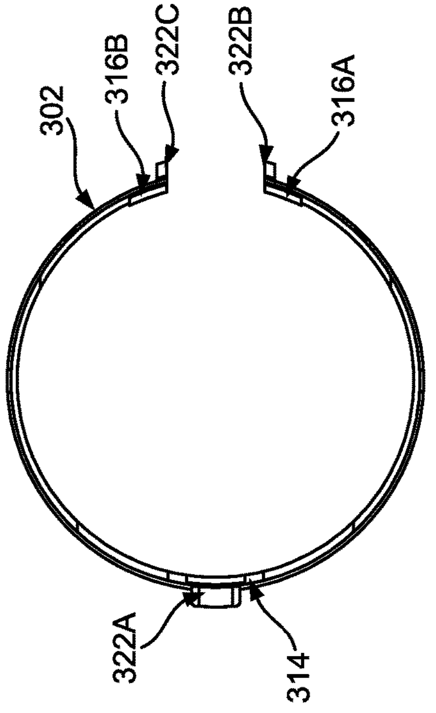
FIG. 8E shows a top view of the example frame subassembly of FIG. 8A.

FIGS. 6A-9B show another example filter 300. The example filter 300 can be used in conjunction with the microphones discussed herein and specifically can be used in conjunction with the microphone assembly 100. In this example, like reference numbers indicate like features and functionality of the examples discussed herein. The filter 300 may in some examples be easier to assemble. The filter 300 assembly generally includes a collapsible frame 302, filter material 304, and a pressure sensitive adhesive 305 (FIG. 9A). FIGS. 6A-6C respectively show a front perspective view, a side perspective view, and a rear perspective view of the assembled filter 300. And FIGS. 7A and 7B show a perspective and top view of the filter material 304. FIGS. 8A-8E show perspective, front, side, rear, and top views of the frame 302 respectively. And FIGS. 9A and 9B show a perspective view and top view of the pressure sensitive adhesive 305.

Figure 6B:
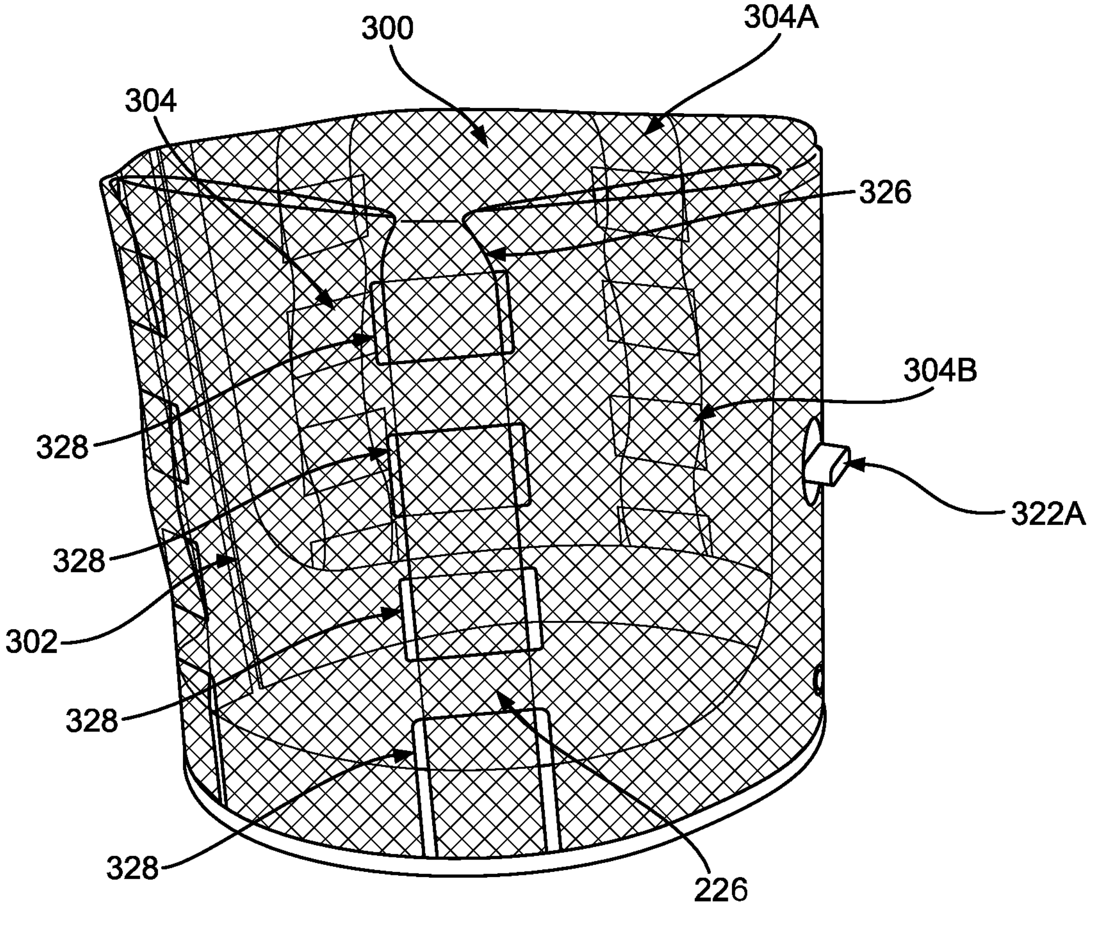
FIG. 6B shows a side perspective view of the example filter of FIG. 6A.
Figure 6C:
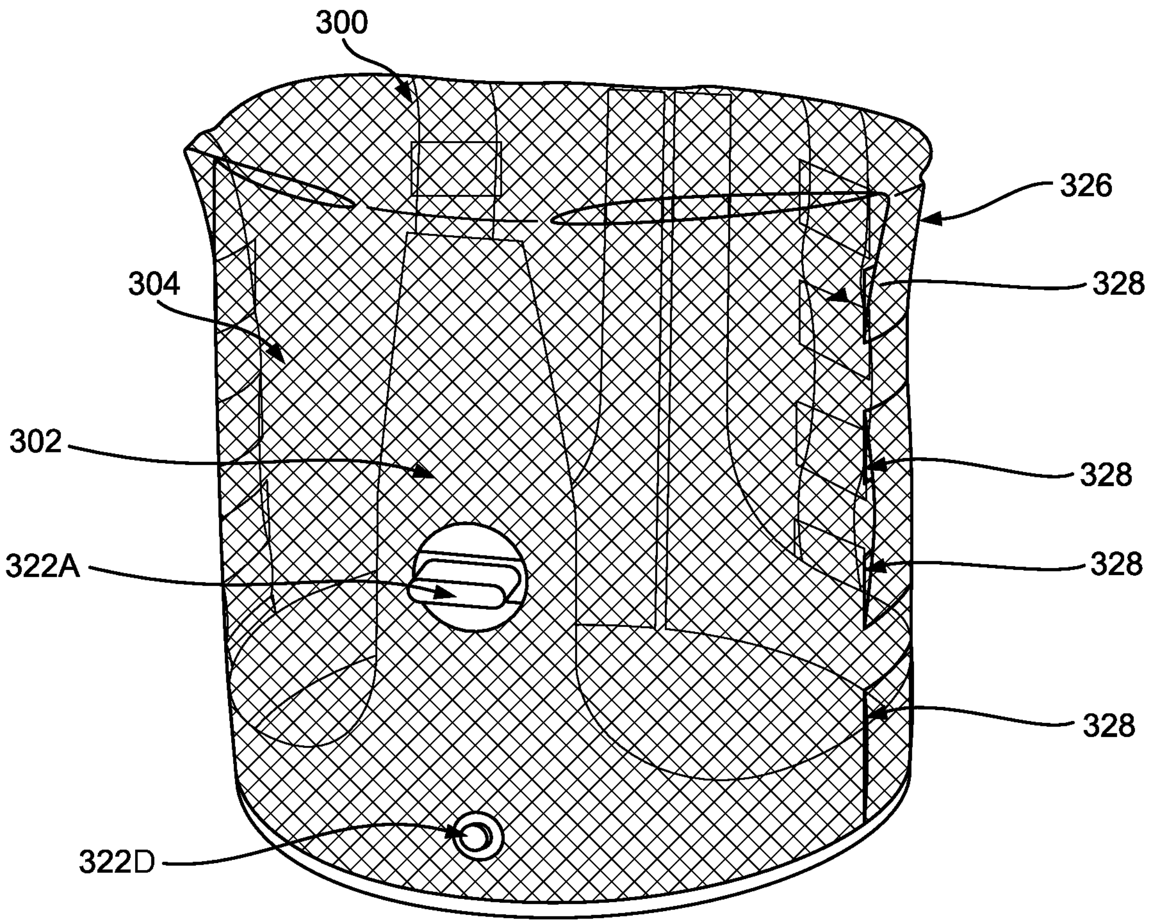
FIG. 6C shows a rear perspective view of the example filter of FIG. 6A.

As in the above example, the filter 300 can be configured to help filter plosives, as is discussed herein. Like in the above example, the filter 300 can include a flexible and collapsible frame 302 and a flexible and collapsible filter material 304. So both the frame 304 and the filter material 304 have a degree of flexibility and collapsibility, such that the filter 300 can be fit within the microphone assembly 100, i.e., the filter 300 (both the frame 302 and the filter material 304) is placed into the grill 102, and the grill is secured to the microphone assembly 100 via threads in one example for ease of assembling the microphone assembly 100 and removability of the filter 300. It is also contemplated that the filter 300 can be configured to be placed over the microphone capsule 104 and configured to fit beneath or under the grill 102 for ease of assembling the microphone assembly 100 and removability of the filter 300. As shown in FIGS. 6A-6C, the filter 300 is generally cup or cylindrical shaped with a covering over the top and an open bottom in its resting shape or configuration. Yet other shapes and configurations are contemplated depending on the type of microphone and the desired shape of the microphone.

In one example, the frame 302 can be injection molded and formed of a suitable flexible polymer. And the frame 302 can be formed of a blend of polycarbonate and ABS plastic. However, other materials are also contemplated, which have the strength and heat resistance of polycarbonate and have the flexibility of ABS plastic. Other materials that exhibit high impact strength and thermal resistance are also contemplated. These materials can be polymers or plastics, or any other materials that have any one or more of: the ability to be flexible for assembly and disassembly, sufficiently rigid to hold their shape once inserted into an assembly, and have a lower cost of a molded part. In certain examples, the polymer or plastic can be a thermoset or a thermoplastic. In certain examples, the frame 302 can be laser cut from a blank of material. In certain examples, a curve can be applied to the frame by placing the frame 302 into a vice and heating the subassembly forming the frame 302. In addition, the frame 302 may be formed of wire, spring steel, or other suitable flexible metal material, which could also be coated with a polymeric material. It is also contemplated that the mesh material could be formed into the shape of a desired frame and the filter 300 could be formed without a frame or the entire filter 300 including the frame could be produced by 3D printing, SLA, MSLA, FDM, etc.

The frame 302 can include a lower rib 324, which extends in a radial or circumferential direction on the frame 302. Referring to FIGS. 8A-8D, three ribs 314, 316A, 316B can extend from the frame 302. In particular, a vertically extending rib 314 and a pair of edge ribs 316A, 316B can extend from the lower rib 324.

As shown in FIGS. 8A and 8B, the edge ribs 316A, 316B also form a gap 318, which extends in a vertical or an axial direction. Like in the above example, axial gap 318 allows for the frame 302 to collapse in that the edge ribs 316A, 316B can abut each other during assembly and the filter can take up a smaller space and profile. As shown in the top view in FIG. 8E, the frame 302 can generally follow the shape of a C.

The vertically extending rib 314 may include a first locating projection 322A, and the pair of edge ribs 316A, 316B can include a second locating projection 322B, and a third locating projection 322C. The first locating projection 322A, second locating projection 322B, and the third locating projection 322C can be used in conjunction for locating the frame within the microphone assembly 100. For example, the microphone assembly 100 can include a corresponding ridge that abuts either the top surface or the bottom surfaces of the first locating projection 322A, second locating projection 322B, and the third locating projection 322C, or the microphone assembly 100 may include one or more recesses for receiving the locating the first locating projection 322A, second locating projection 322B, and the third locating projection 322C. The first locating projection 322A, second locating projection 322B, and the third locating projection 322C can allow for the filter 300 to be installed into the microphone assembly 100 in a certain orientation. Also, the first locating projection 322A, second locating projection 322B, and the third locating projection 322C can be configured to key into the grill 102 or to align properly within the grill 102, to prevent the filter 300 from moving around or vibrating inside the grill 102, while allowing it to be easy to install and remove. This can assist to prevent any excess handling noise and may assist in preventing noise from any resonances caused by the filter. The use of fewer or additional projections extending in any direction to provide the desired frame properties is also contemplated. Additionally, a fourth projection 322D can be included for locating the filter material 304 and pressure sensitive adhesive 305 (shown in FIGS. 9A and 9B) on the frame 302.

Referring again to FIGS. 6A-6C, the filter material 304 can include sections of mesh material: a top section 304A and a sidewall section 304B. The top section 304A can be shaped, cut or formed as circular and can be disc-shaped as shown in FIG. 7A. The sidewall 304B section can be shaped, formed or cut as a rectangular piece as shown in FIG. 7A. The top section 304A and the sidewall section 304B can have the same thickness or different thicknesses. And in one particular example, the top section 304A mesh can be thicker than the sidewall section mesh 304B. Although again, the shapes of the top section 304A and the sidewall section 304B can vary based on the overall shape or type of microphone transducer, desired grill, and desired sound properties. As shown in FIG. 6C one or more gaps can be formed between the top section 304A and the sidewall section 304B. The sidewall section 304B of the mesh can be configured to assist in preventing the plosive or pop phenomenon when a user is holding the microphone at a 45 or 90 degree angle for example. And in certain examples, alternating layers of filter material and air gaps can be provided along the sidewall section 304B to assist in mitigating the pop or plosive phenomenon.

Referring to FIGS. 7A and 7B, which show the filter material 304 prior to assembly to the frame 302, the top section 304A can be formed of a circular shape with four rectangular-shaped arm portions 326 extending from the circular shape forming the top section 304A. The four arms 326 ultimately form part of the sidewall 304B of the filter material. And in particular, the top section 304 is folded and each of the four arms 326 is folded and weaved or interweaved into four sets of square-shaped openings 328. In one example, the arms 326 are placed at about 70 degrees apart. The arms 326 can include a reduced width neck portion 326A for ease of foldability. Each set of the square-shaped openings 328 extend vertically to accommodate the rectangular shaped arms 326. And in one example, the openings located at the bottom of the of the filter material 304 can extend through the bottom edge of the filter material 304 for ease of manufacturability. The filter material 304 can also be provided with an opening 330 for receiving first locating projection 322A of the frame 302. The filter material 304 can also be provided with an additional opening 332 for receiving fourth locating projection 322D of the frame 302. It is also contemplated that more or less arms and more or less openings can be used to form the desired shape of the filter material 304. The number of arms 326 and openings 328 can help to provide a flatter top section 304A when assembled. It is also contemplated that the arms 326 can be glued, adhered, or otherwise attached by a suitable method to the sidewall of the filter material 304 instead of interweaved. Suitable mesh materials for the filter material 304 are described herein. In one particular example, the mesh can be a PolyCloth and can be black in color.

In one example, the pressure sensitive adhesive 305 (shown in FIGS. 9A and 9B) can be applied to the frame 302 to secure the filter material 304 to the frame 302. In particular, the pressure sensitive adhesive 305 can be provided with a lower section 305A to follow and adhere to the lower rib 324 of the frame, a vertically extending central section 305B to follow and adhere to the vertically extending rib 314 of the frame, a pair of vertically extending outer sections 305C which follow and adhere to the pair of edge ribs 316A, 316B. The pressure sensitive adhesive 305 may also include a first opening 305D for accommodating the first locating projection 322A of the vertically extending rib 314 of the frame 302, shown in FIG. 8D. The pressure sensitive adhesive 305 may also include a second opening 305E for accommodating the fourth locating projection 322D of the vertically extending rib 314 of the frame 302, shown in FIG. 8D. The first locating projection 322A and the fourth locating projection 322D of the frame 302 help to ensure that the pressure sensitive adhesive 305 is applied to the correct area of the frame 302. As such, once the pressure sensitive adhesive 305 is applied to the frame 302, the filter material 304 can be adhered to the frame 302 to form the filter 300. Like in the above example, it is also contemplated that the mesh material top section 304A and sidewall section 304B could be co-molded or insert molded with the frame 304.

In one example, a microphone assembly can include a microphone capsule having a diaphragm and a diaphragm cover. The microphone assembly can include a grill for protecting the microphone capsule, a filter material placed between the grill and the diaphragm cover. Also a first air gap can be formed between the grill and the filter material to create a first interface, a second air gap can be formed between the filter material and the diaphragm cover to create a second interface, a third air gap can be formed between the diaphragm cover and a diaphragm to create a third interface. The first interface, the second interface, and the third interface can each be configured to create turbulence to assist in draining off energy from plosives and wind and reduce intensity of disturbances at the diaphragm caused by plosives and wind.

In another example, the filter material can include a mesh, and the filter material may be supported by a frame and the frame is configured to fit underneath the grill. The frame can be collapsible and removeable from the microphone assembly. The frame can be formed with one or more gaps for collapsibility.

In another example, a microphone assembly can include a filter having a flexible frame and a filter material. The filter can be configured to help filter plosives. And the filter can be formed of one or more collapsible materials such that the filter is collapsible in order to fit within the microphone assembly. The microphone assembly can also include a grill and the filter can be configured to fit beneath the grill.

The grill and the filter can be spaced to define a first air gap and the first air gap and the filter material can be configured to help filter plosives. The microphone assembly can also include a diaphragm and the filter and the diaphragm can be spaced to define a second air gap and the first air gap. The filter material, and the second air gap can be configured to help filter plosives. Also the filter can be removable from the microphone assembly.

In one example, the frame can be formed of an elastic material. The frame may also include a frame gap. The frame gap can extend in a vertical or axial direction. And in one example, the frame gap can extend in a radial direction. In one example the frame can also include a locating projection and the locating projection extends radially. Also the frame can include a lower rib and three ribs extending vertically from the lower rib. The three ribs can include a pair of edge ribs and the pair of edge ribs define a gap.

In one example, the filter material may include a plurality of arms and a plurality of openings and the plurality of arms can be interweaved into the plurality of openings and the filter material can be fixed to the frame.

In one example, the frame can include a lower rib and three ribs extending vertically from the lower rib. The three ribs can further include a pair of edge ribs and the pair of edge ribs may define a gap. The filter material may include a plurality of arms and a plurality of openings and the plurality of arms can be interweaved into the plurality of openings and wherein the filter material is fixed to the frame.

In one example, the filter may comprise a mesh, and the filter can be cylindrical or cup shaped. In one example, the filter can include a top portion and a side portion, and the top portion can include a first filter material and the side portion can include a second filter material and the first filter material of the top portion can be thicker than the second filter material of the side portion. In one example, the filter defines a top portion and the mesh can extend over the top portion and the filter can define an open bottom portion. The filter may include a frame having an upper rib, a middle rib and a lower rib. The frame can include a ring, and the upper rib and the ring may define a gap to allow for the filter to be compressible.

In another example, a method for filtering a microphone can include one or more of providing a first air gap between a grill and a filter material to create a first interface, providing a second air gap between the filter material and a diaphragm cover to create a second interface, and providing a third air gap between the diaphragm cover and a diaphragm to create a third interface. The first interface, the second interface, and the third interface can be each configured to create turbulence to assist in draining off energy from plosives and wind and reduce intensity of disturbances at the diaphragm caused by plosives and wind.

An exemplary method can also include one or more of forming the filter material of a mesh, supporting the filter material with a frame and configuring the frame to fit underneath the grill, forming the frame to be collapsible, forming the frame with one or more gaps for collapsibility.

An exemplary method can also include forming the frame with a lower rib and a plurality of ribs extending vertically from the lower rib and forming the plurality of ribs with a pair of edge ribs and spacing the pair of edge ribs to define a gap.

In the foregoing specification, the present disclosure has been described with reference to specific exemplary embodiments thereof. Although the disclosure has been described in terms of a preferred embodiment, those skilled in the art will recognize that various modifications, embodiments or variations of the disclosure can be practiced within the spirit and scope of the disclosure as set forth in the appended claims. The specification and drawings are, therefore, to be regarded in an illustrated rather than restrictive sense. Accordingly, it is not intended that the disclosure be limited except as may be necessary in view of the appended claims.

What is claimed is:

1. A microphone assembly comprising:
- a microphone capsule comprising a diaphragm and a diaphragm cover;
- a grill for protecting the microphone capsule;
- a filter material placed between the grill and the diaphragm cover, wherein the filter material comprises a mesh and is supported by a frame that is configured to be collapsible for assembly;
- a first air gap between the grill and the filter material to create a first interface,
- a second air gap between the filter material and the diaphragm cover to create a second interface; and
- a third air gap between the diaphragm cover and the diaphragm to create a third interface;
- wherein the first interface, the second interface, and the third interface are each configured to create turbulence to assist in draining off energy from plosives and wind and reduce intensity of disturbances at the diaphragm caused by plosives and wind.

2. The microphone assembly of claim 1 wherein the frame is configured to fit underneath the grill and wherein the frame is configured to be collapsible and removeable from the microphone assembly.

3. The microphone assembly of claim 2 wherein the frame is formed with one or more gaps for collapsibility.

4. The microphone assembly of claim 2 wherein the frame comprises a lower rib and a plurality of ribs extending vertically from the lower rib.

5. The microphone assembly of claim 4 wherein the plurality of ribs further comprise a pair of edge ribs and wherein the pair of edge ribs define a gap.

6. The microphone assembly of claim 1 wherein the filter material comprises a plurality of arms and a plurality of openings and wherein the plurality of arms are interweaved into the plurality of openings and wherein the filter material is fixed to the frame.

7. An apparatus comprising:
- a filter placed between a grill and a diaphragm cover, wherein the filter comprises a flexible frame and a mesh filter material, and
- wherein the filter is configured to assist in filtering plosives and wherein the filter is formed of one or more collapsible materials such that the filter is collapsible for assembly.

8. The apparatus according to claim 7, wherein the filter is configured to fit beneath a grill and is configured to be removable and wherein the filter is cylindrical or cup shaped.

9. The apparatus according to claim 7 wherein the filter is configured to define a first air gap when assembled and wherein the first air gap and the filter material are configured to help filter plosives.

10. The apparatus according to claim 9 wherein the filter is configured to define a second air gap and wherein the first air gap, the filter material, and the second air gap are configured to help filter plosives.

11. The apparatus according to claim 7 wherein the frame comprises a frame gap and wherein the frame is formed of an elastic material.

12. The apparatus according to claim 11 wherein the frame gap extends in a vertical or axial direction.

13. The apparatus of claim 7 wherein the frame comprises a lower rib and a plurality of ribs extending vertically from the lower rib.

14. The apparatus of claim 13 wherein the plurality of ribs further comprise a pair of edge ribs and wherein the pair of edge ribs define a gap.

15. The apparatus of claim 7 wherein the filter material comprises a plurality of arms and a plurality of openings and wherein the plurality of arms are interweaved into the plurality of openings and wherein the filter material is fixed to the frame.

16. The apparatus according to claim 7 wherein the frame further comprises a locating projection and wherein the locating projection extends radially.

17. The apparatus according to claim 7 wherein the filter defines a top portion and wherein mesh extends over the top portion and wherein the filter defines an open bottom portion.

18. A method for filtering a microphone comprising:
- providing a first air gap between a grill and a filter material to create a first interface;
- supporting the filter material with a frame;
- configuring the frame to fit underneath the grill and to be collapsible for assembly by forming the frame with one or more gaps for collapsibility; providing a second air gap between the filter material and a diaphragm cover to create a second interface; and
- providing a third air gap between the diaphragm cover and a diaphragm to create a third interface;
- wherein the first interface, the second interface, and the third interface are each configured to create turbulence to assist in draining off energy from plosives and wind and reduce intensity of disturbances at the diaphragm caused by plosives and wind.

19. The method of claim 18 further comprising forming the filter material of a mesh.

20. The method of claim 18 further comprising forming the filter material with a plurality of arms and a plurality of openings and interweaving the plurality of arms into the plurality of openings and adhering the filter material to the frame.

* * * * *